United States Patent
Saga et al.

[11] Patent Number: 5,815,824
[45] Date of Patent: Sep. 29, 1998

[54] NAVIGATION SYSTEM FOR ELECTRIC AUTOMOBILE

[75] Inventors: Kenichi Saga, Nagoya; Nobuyuki Kawamura, Okazaki, both of Japan

[73] Assignee: Mitsubishi Jidosha Kogyo Kabushiki Kaisha, Tokyo, Japan

[21] Appl. No.: 611,577

[22] Filed: Mar. 6, 1996

[30] Foreign Application Priority Data

Mar. 6, 1995 [JP] Japan ................................. 7-045934

[51] Int. Cl.[6] ............................. G01L 21/00; B60L 11/02
[52] U.S. Cl. ............................ 701/22; 701/202; 701/201; 180/65.2; 180/65.4
[58] Field of Search .................... 364/424.026, 449.2, 364/449.3, 444.1, 444.2, 449.7; 180/65.1, 65.2, 65.4, 65.8; 701/22, 208, 209, 201, 202, 213

[56] References Cited

U.S. PATENT DOCUMENTS

| 4,306,156 | 12/1981 | Monaco et al. ......................... 290/17 |
| 4,926,336 | 5/1990 | Yamada ................................. 364/444 |
| 5,176,213 | 1/1993 | Kawai et al. .......................... 180/243 |
| 5,283,513 | 2/1994 | Fujita et al. ............................. 320/56 |
| 5,441,122 | 8/1995 | Yoshida ................................. 180/65.2 |
| 5,487,002 | 1/1996 | Diller et al. ....................... 364/424.01 |
| 5,539,399 | 7/1996 | Takahira et al. ...................... 340/995 |
| 5,627,752 | 5/1997 | Buck et al. ............................. 701/35 |
| 5,664,635 | 9/1997 | Koga et al. .......................... 180/65.3 |

FOREIGN PATENT DOCUMENTS

| 4-25720 | 1/1992 | Japan . |
| 6-187595 | 7/1994 | Japan . |

Primary Examiner—Michael Zanelli

[57] ABSTRACT

A navigation system suitable for use in an electric automobile, especially hybrid electric automobiles, easily and properly controls charging state of a battery in the electric automobile while making use of characteristic features of the navigation system. The navigation system is mounted on the electric automobile. A destination, to which one wants to drive by the automobile, is inputted as drive plan information. Based on a distance planned to be driven by the automobile to the destination and a remaining capacity of the battery determined by remaining capacity detector, it is determined whether the automobile can reach the destination with the remaining capacity of the battery.

23 Claims, 15 Drawing Sheets

NAVIGATION SYSTEM FOR ELECTRIC AUTOMOBILE

BACKGROUND OF THE INVENTION a) Field of the Invention

This invention relates to a navigation system suitable for installation on an electric automobile, and specifically to a navigation system suitable for use in an electric automobile, especially, a hybrid electric automobile which is equipped with a dynamo heat engine and can be driven while generating electric power.

b) Description of the Related Art

In recent years, developments of navigation systems for automobiles, which are generally called "car navigation systems", have become increasingly active and as a matter of fact, such navigation systems are now finding widespread commercial utility. A navigation system of this type is provided with means for detecting a present position of an automobile and means for storing road map information in a CD-ROM or the like. When a destination of the automobile (which may hereinafter be also called the "vehicle") is set by the driver, the navigation system selects the best route from the present position to the destination and guides the driver along the best route so selected.

For the detection of the present position of the vehicle, a (Global Positioning System) navigation or an autonomous navigation is used in general. With the GPS navigation, for example, a navigation system receives radio waves (GPS information) transmitted from plural (three or more) satellites and based on this GPS information, detects the present position of the automobile. In combination with the above-described navigation, so-called a map matching, which is a method of correcting the thus-detected present position of the vehicle such that the detected present position can be co-related to a point along a road on a map, is also practiced. This makes it possible to detect the present position of the vehicle more accurately.

Such a navigation system is designed to display the present position of a vehicle, which has been detected as described above, together with the best route selected according to a destination on a screen. If a right-hand or left-hand turn is needed at an intersection or the like, the system guides accordingly by a voice before the vehicle enters the intersection. In addition, navigation systems which have been developed, include those capable of estimating a time required to reach, from the present position of a vehicle, a destination along the best route and displaying the same.

Simultaneous to the developments of such navigation systems, electric automobiles which do not emit exhaust gas are now receiving attention again from the standpoint of protection of the global environment. With a view to enhance the utility of electric automobiles, a variety of techniques are now under development. There are, however, still various problems with electric automobiles at this stage in terms of practical application.

For example, at the present stage, a battery as an energy source for an electric drive motor inevitably becomes heavier if one wants to increase its capacity. Any attempt to extend the coverable distance, in other words, the range of an electric automobile per charge, requires the mounting of a larger battery, thereby causing a substantial increase in the weight of the vehicle and also a significant increase in the space required for its installation. Such a large battery hence inconveniently deteriorates the power performance, riding comfort and loading capacity of the vehicle.

To secure the power performance, riding comfort, loading capacity and the like of the vehicle at practically-needed minimum levels, an unavoidable limitation is therefore imposed on the range per charge under the circumstances. It is, therefore, necessary to monitor the remaining capacity of a battery, so that the battery can be charged before its remaining capacity drops beyond a limit.

As to such charging of batteries of electric automobiles, it may generally be considered that charging would be facilitated by battery-charging stations equivalent to gas stations for gasoline engine automobiles arranged along roads and, to charge the battery of each electric automobile, the electric automobile would be driven to the nearby battery-charging station to charge its battery.

To date, however, such battery-charging stations have not yet been spread, and a substantial time is believed to be needed until they do spread. Further, charging of a battery cannot be completed in such a short time as refueling although the time required for charging has become shorter. It is, therefore, the current situation that charging of a battery cannot be conducted conveniently unlike refueling. If a vehicle should stop on a road due to an insufficient capacity of its battery, it would not be possible to easily cope with this trouble, unlike gasoline vehicles.

With a view to reduce such inconveniences of electric automobiles at the present stage, electric automobiles with a heat engine—which is generally an internal combustion engine and hence, will hereinafter be referred to as an "internal combustion engine",—directly mounted thereon, known as, hybrid electric automobiles have been proposed.

These hybrid automobiles can be classified into so-called series hybrid vehicles and parallel hybrid vehicles.

A series hybrid vehicle carries an internal combustion engine and an alternator driven by the internal combustion engine. When the capacity of a battery becomes insufficient, the internal combustion engine is operated to generate electric power by the alternator and, while charging the battery with the electric power so generated, the vehicle is driven. It is therefore possible to drive the electric automobile even when the capacity of the battery becomes insufficient.

On the other hand, a parallel hybrid vehicle is provided with a driving internal combustion engine mounted in parallel with an electric drive motor so that wheels can be driven not only by the electric drive motor but also by the running internal combustion engine. It is therefore still possible to drive the automobile by the driving internal combustion engine even when the capacity of the battery becomes insufficient.

In such a hybrid electric automobile, auxiliary operation of an internal combustion engine, therefore, makes it possible to extend the coverable distance of the automobile while effectively reducing exhaust gas and hence, air pollution.

The above-mentioned hybrid electric automobiles, however, cannot completely avoid air pollution, because they obviously emit exhaust gas when their internal combustion engines are operated.

It may hence be contemplated that an operation mode of a hybrid electric automobile be set in such a way that operation of its internal combustion engine is inhibited in an area high in the need for control of air pollution such as an urban area (a pollution-inhibited area) but permitted in an area low in the need for control of air pollution such as a suburb (pollution-non-inhibited area).

In the case of a series hybrid vehicle, for example, unless the vehicle is in a pollution-inhibited area, a dynamo internal combustion engine is operated to drive an alternator when the remaining capacity of the battery drops below a predetermined level and, while charging a battery with the resulting electric power, an electric drive motor is operated to drive the vehicle. When the vehicle has entered a pollution-inhibited area, the electric drive motor is operated using the remaining capacity of the battery without performing generation of electric power and the vehicle is driven by drive power from the electric drive motor.

In this manner, it is possible to extend the coverable distance with a smaller battery capacity while avoiding air pollution especially in an urban area where the situation of air pollution is serious.

For electric automobiles including those carrying an internal combustion engine (hybrid vehicle), to say nothing of those carrying no internal combustion engine, the charging of a battery should, properly speaking, be conducted at a battery-charging station when the capacity of the battery has dropped. Namely, the internal combustion engine mounted on each hybrid vehicle is fundamentally an auxiliary to allow the vehicle to extend its coverable distance to a nearby battery-charging station if the capacity of the battery is so low that the vehicle cannot reach the battery-charging station by drive power from the electric drive motor. Desirably, driving the vehicle by relying upon the internal combustion engine should, therefore, be studiously avoided.

It is, therefore, necessary for an electric automobile to be adequately charged based on the remaining capacity of its battery. This requires both determination of the remaining capacity of the battery and also determination of whether the remaining capacity is sufficient to reach a destination from the present position. Needless to say, if the destination is far ahead, it is necessary to determine whether the remaining capacity of the battery is sufficient to reach a battery-charging station on the way to the destination where charging has been planned.

For this purpose, Prediction of consumption of the battery in accordance with the driver's drive plan is required. Use of the above-mentioned automobile navigation system may be contemplated for the prediction of consumption of the battery up to the destination of the vehicle because according to the navigation system, as components of the driver's drive plan, for example, the destination is inputted and a drive route to the destination is selected for the vehicle.

Further, road map information is stored in the navigation system. It is also contemplated that information on pollution-inhibited areas in correspondence to the map information be stored so that the navigation system can also be used for controlling operation of the internal combustion engine of the hybrid vehicle depending on whether the vehicle is within a pollution-inhibited area or not.

Moreover, it is also contemplated that the locations of battery-charging stations, which have not spread widely, be stored in correspondence to the map information so that the location of each desired battery-charging station could be indicated to the driver.

SUMMARY OF THE INVENTION

With the foregoing in view, it is an object of the present invention to make it possible to easily and properly control a battery of an electric automobile while making use of characteristic features of a navigation system.

A specific object of the present invention is to enable a driver to ascertain whether a remaining capacity of a battery is sufficient to reach a destination.

Another specific object of the present invention is to allow the driver to determine whether the remaining capacity of the battery is sufficient to reach a battery-charging station on the way to the destination if it has been planned to charge on the way to the destination.

A further specific object of the present invention is to make it possible to indicate the location of the battery-charging station to the driver.

In one aspect of the present invention, there is thus provided a navigation system for an electric automobile having:

a battery, an electric drive motor for driving wheels upon being fed with electric power from the battery, motor control means for controlling operation of the electric drive motor while adjusting electric power to be fed to the electric drive motor in accordance with artificial output demand operation, and remaining capacity detection means for detecting a remaining capacity of the battery, and said navigation system being provided with:

road map information storage means for storing road map information, drive plan information input means for artificially performing inputting operation with respect to information on a drive plan of the automobile, present position detecting means for detecting a present position of the automobile, and indication control means for controlling screen display information and/or audio indication information of map information and route information on the basis of pieces of information from the road map information storage means, the drive plan information input means and the present position detecting means, wherein the drive plan information comprises a destination of the automobile, and the navigation system further comprises:

reachability determination means for determining, based on a distance planned to be driven by the automobile to the destination and the remaining capacity of the battery determined by the remaining capacity detection means, whether the automobile can reach the destination with the remaining capacity of the battery. The navigation system makes it possible to smoothly drive to the destination without causing premature flattening of the battery while adequately ascertaining the remaining capacity of the battery.

The drive plan information may comprise, in addition to the destination, a planned charging point at which charging of the battery is planned along a route to the destination, and the reachability determination means may comprise means for determining, based on a distance planned to be driven by the automobile to the planned charging point and the remaining capacity of the battery determined by the remaining capacity detection means, whether the automobile can reach the planned charging point with the remaining capacity of the battery. This makes it possible to properly advise the driver of the need for charging so that the driver can pleasantly drive the vehicle while ascertaining the remaining capacity of the battery.

The navigation system may further comprise use-condition-limited reachability determination means for setting, when the automobile is determined to be unable to reach the destination by the reachability determination means, a use condition for the electric drive motor or an accessory so as to permit use of the battery while economizing on electric power and then determining whether the automobile can reach the destination under the so-set motor use condition. This makes it possible to smoothly drive to the destination without causing the battery to go flat, for example, even when the destination is faraway.

The navigation system may further comprise indication means for indicating unreachability of the automobile when the automobile is determined to be unable to reach the destination by the reachability determination means. This makes it possible to adequately charge the battery without causing premature flattening of the battery. The navigation system may further comprise indication means for indicating the need for a change in and reset of the drive plan information when the automobile is determined to be unable to reach the destination by the reachability determination means. This makes it possible to smoothly drive to the destination without causing premature flattening of the battery.

The drive plan information may comprise, in addition to the destination, a plurality of charging points available along the route to the destination, and the navigation system may further comprise display means for displaying one or more of the available charging points, to which the automobile is found to be reachable by the reachability determination means, when the automobile is determined to be unable to reach the destination by the reachability determination means. This makes it possible to surely perform charging of the battery with extreme ease and also to achieve a smooth drive to the destination while ensuring prevention of flattening of the battery without the need for a change to the route to the destination.

The reachability determination means may comprise means for performing a determination at the time of input of the drive plan information and also performing determinations in response to variations in the remaining capacity of the battery during travelling of the automobile. This makes it possible to adequately charge the battery without causing premature flattening of the battery and hence to smoothly drive to the destination even if due to a traffic jam or the like, for example, more electric power of the battery is consumed than that planned.

In addition to the battery, the electric drive motor, the motor control means and the remaining capacity detection means, the electric automobile may also have:

an alternator connected to the battery to permit charging of the battery, a dynamo heat engine for driving the alternator, and heat engine control means for controlling operation of the heat engine, whereby the automobile is constructed as a hybrid electric automobile having, as drive modes, a power-generating drive mode in which the automobile is driven while operating the alternator as needed and a power-non-generating drive mode in which the automobile is driven only by electric power charged in the battery without operating the alternator; and the navigation system may additionally be provided with:
pollution-inhibited area storage means containing information on a pollution-inhibited area corresponding to the road map information, area determination means for determining, based on information from the present position detection means and the pollution-inhibited area storage means, whether the present position of the automobile is in the pollution-inhibited area, and drive mode selection command means for outputting a command signal to the heat engine control means on the basis of results of a determination by the area determination means so that the power-non-generating drive mode is selected when the present position of the automobile is found to be within the pollution-inhibited area but the power-generating drive mode is selected when the present position of the automobile is found to be outside the pollution-inhibited area. This makes it possible to automatically and properly change over the drive mode so that the distance coverable with a small battery capacity can be extended while effectively avoiding air pollution. It is hence possible to provide the hybrid electric automobile with substantially improved practical utility.

In the preferred embodiment described immediately above, the automobile may additionally have, as an additional drive mode, a forced power-generating mode in which the automobile is driven with the alternator always operated; the area determination means may comprise means for determining, based on information from the present position detection means and the pollution-inhibited area information storage means, whether the present position of the automobile is in a zone approaching the pollution-inhibited area and also whether the pollution-inhibited area still remains along a planned drive route from the present position of the automobile to the destination; and the drive mode selection command means comprises means for outputting a command signal to select the forced power-generating mode until the battery is brought into a predetermined charged state when based on the results of the determination by the area determination means, the present position of the automobile is determined to be within the zone approaching the pollution-inhibited area and the pollution-inhibited area is determined to still remain along the planned drive route to the destination. This makes it possible to automatically and properly change over the drive mode and further to drive into a pollution-inhibited area with a sufficient remaining battery capacity. It is accordingly possible to further extend the distance coverable with a small battery capacity while effectively avoiding air pollution. The hybrid electric automobile can therefore be substantially improved in practical utility.

A global positioning system may be used as the present position detection means. This makes it possible to precisely detect the present position of the vehicle, thereby obtaining the above-mentioned various advantages more easily and surely.

In another aspect of the present invention, there is also provided a navigation method for providing guidance concerning travelling of an electric automobile, which has:

a battery, an electric drive motor for driving wheels upon being fed with electric power from the battery, motor control means for controlling operation of the electric drive motor while adjusting electric power to be fed to the electric motor in accordance with artificial output demand operation, and remaining capacity detection means for detecting a remaining capacity of the battery, by using a navigation system mounted on the automobile and provided with:
road map information storage means for storing road map information, drive plan information input means for artificially performing inputting operation with respect to information on a drive plan of an automobile, present position detecting means for detecting a present position of the automobile, and indication control means for controlling screen display information and/or audio indication information of map information and route information on the basis of pieces of information from the road map information storage means, the drive plan information input means and the present position detecting means, which method comprises:

inputting, as a first step, a destination of the automobile via the drive plan information input means, determining, as a second step, based on a distance planned to be driven by the automobile to the destination and the remaining capacity of the battery determined by the remaining capacity detection means, whether the automobile can reach the destination with the remaining capacity of the battery, and performing, as a third step, an indication via the indication control means on the basis of results of a determination in the second step.

The navigation method may be practiced like the various preferred embodiments described above with respect to the navigation system according to the one aspect of the present invention, and can bring about advantages similar to those of the corresponding preferred embodiments.

DESCRIPTION OF THE PREFERRED EMBODIMENTS

Preferred embodiments of the present invention will, hereinafter, be described with reference to the accompanying drawings, in which FIG. 1 through FIG. 11 illustrate the automobile navigation system according to the first embodiment whereas FIG. 12 through FIG. 15 depict the automobile navigation system according to the second embodiment.

Figure 2:
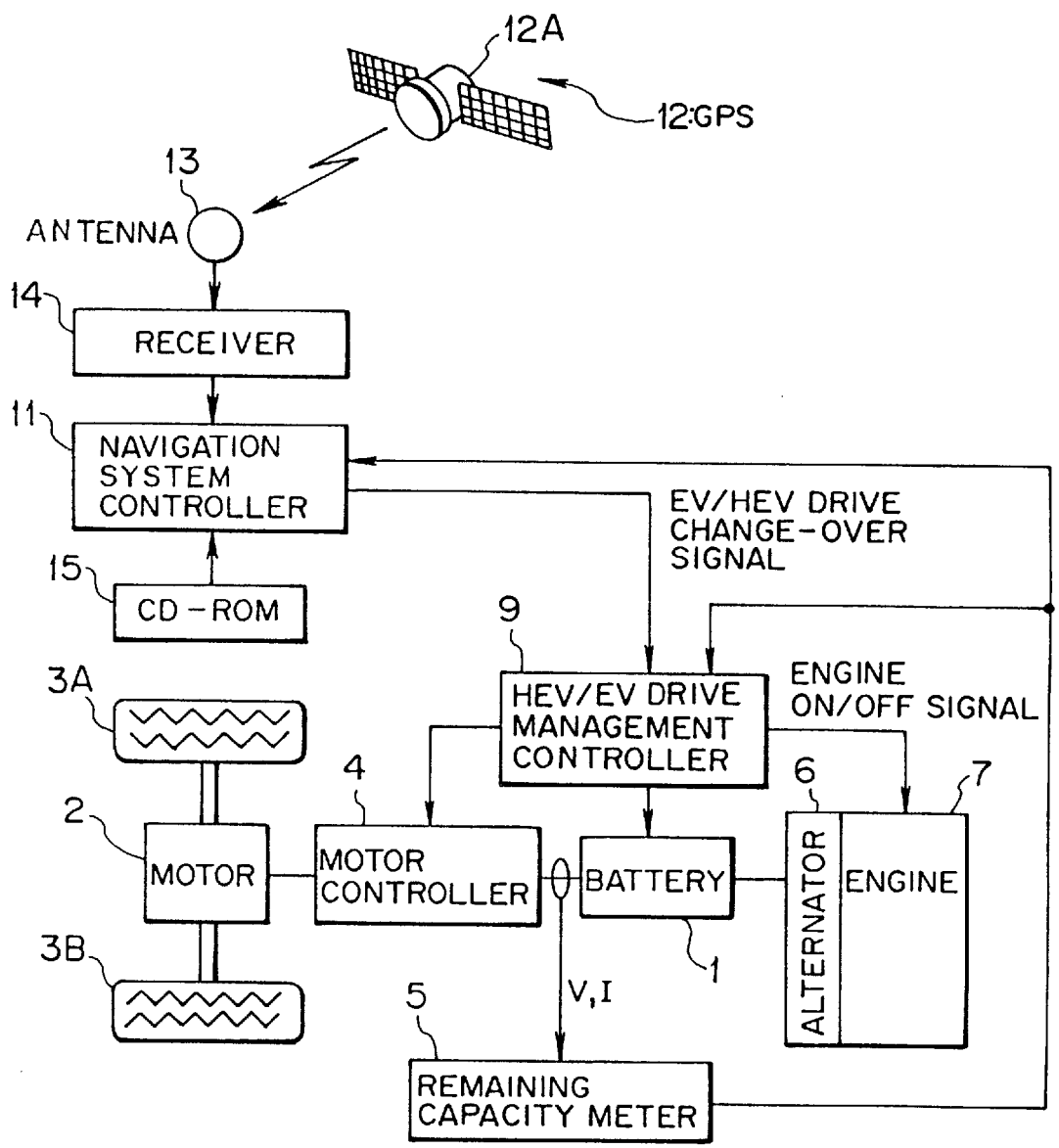
FIG. 2 is a schematic block diagram of the electric automobile with the navigation system according to the first embodiment mounted thereon.

A description will first be made of the first embodiment. The navigation system is mounted on such a hybrid electric automobile as shown in FIG. 2. The hybrid electric automobile referred to with respect to this embodiment is a series hybrid vehicle.

In FIG. 2, numeral 1 indicates a battery. This battery 1 can also be repeatedly charged by an external charger (not shown) which is not mounted on the automobile. Designated at numeral 2 is a motor (electric drive motor) which is fed with electric power from the battery 1. By this motor 2, drive wheels 3A,3B of the automobile are driven. An output of the motor 2 is controlled by a motor controller (motor control means) 4. At the motor controller 4, the output of the motor 2 is controlled based on output demand operation (i.e., a position of an unillustrated accelerator pedal depressed) by a driver, a present state of operation of the motor 2, and the like. Further, the motor controller 4 is designed so that upon detection of a braking command from an actuation of an unillustrated brake pedal or the like, the motor 2 is changed over to an alternator to perform regenerative braking, that is, to apply braking force while generating electric power by rotary energy from the drive wheels 3A,3B.

Designated at numeral 5 is a remaining capacity meter which detects a remaining capacity of the battery 1. This residual capacity meter estimates a remaining capacity of the battery 1, for example, by using a remaining capacity, which can be estimated from an open-circuit terminal voltage V of the battery when the battery has been fully charged, as a reference value, and successively changing this reference value in accordance with capacities, each of which increases or decreases based on a current I whenever the battery 2 is charged or discharged.

The alternator is designated at numeral 6. This alternator 6 is driven by a dynamo internal combustion engine (hereinafter called the "engine") 7 as a dynamo heat engine. The alternator 6 is connected to the battery 1 so that the battery 1 can be charged with generated electric power. As the dynamo heat engine, it is possible to use an external combustion engine such as a gas turbine or a Stirling engine besides an internal engine such as a gasoline engine or a diesel engine.

An output of the engine 7 is controlled by adjusting the throttle position (not illustrated.). This control of the engine 7 is governed by an HEV/EV drive management controller 7 which also functions as internal combustion engine control means.

Incidentally, HEV is an abbreviation of a hybrid electric vehicle while EV stands for an electric vehicle.

This electric automobile is equipped with a power-generating drive mode, a power-non-generating drive mode and a forced power-generating drive mode, and is driven in one of these modes.

In the power-generating mode, the electric automobile is driven by operating the motor 2 while operating the engine 7, as needed, and charging the battery 1 with electric power generated by the alternator 6. This power-generating drive mode is also called the "HEV mode".

In the power-non-generating drive mode, the electric automobile is driven by operating the motor 2 only with electric power stored in the battery 1 without operating the engine 7. This power-non-generating drive mode is also called the "EV mode".

In the forced power-generating drive mode, on the other hand, the electric automobile is driven by operating the motor 2 while always operating the engine 7 and charging the battery 1 with electric power generated by the alternator 6. Electric power is always generated during driving in this forced power-generating drive mode, although electric power is generated as needed in the course of driving in the HEV mode (the power-generating drive mode).

Selection of one drive mode out of these drive modes is performed via the HEV/EV drive management controller 9. At the drive management controller 9, the one drive mode is selected based on selection command information from a navigation system 11 and detection information from the remaining capacity meter 5 arranged as an accessory to the battery 1.

A description will now be made of the navigation system 11 for the electric automobile.

Figure 1:
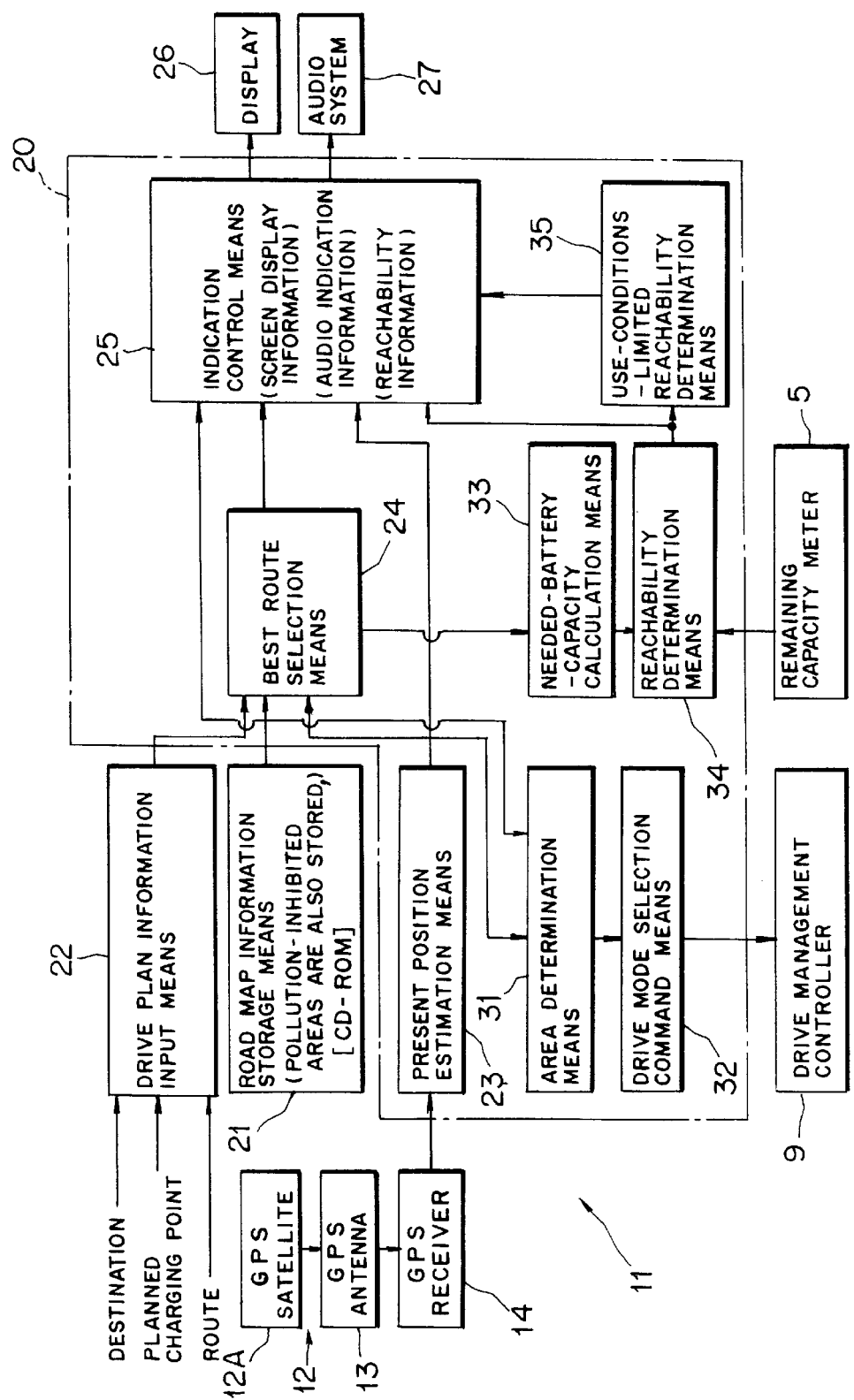
FIG. 1 is a block diagram schematically showing the functional construction of a navigation system according to a first embodiment of the present invention for an electric automobile.

As is depicted in FIG. 1, this navigation system 11 is provided with a navigation system controller 20, road map information storage means 21, and drive plan information input means 22.

The controller 20 is composed, in terms of its hardware construction, of an arithmetic unit for performing various operations as a CPU, an interface for processing information to be inputted to the arithmetic unit and information outputted from the arithmetic unit, storage devices such as ROM and RAM, and the like. The functional construction of this controller 20 will be described subsequently herein.

The road map information storage means 21 comprises, for example, a CD-ROM or the like. Stored in this map information storage means 21 include information on road maps stored in plural hierarchical levels of different reductions as well as information on road classes such as highways, general national roads and local roads and information on traffic conditions for intersections. In this embodiment, the map information storage means 21 also contains other information in correspondence to the road map information, including class information about whether each map area is an area high in the need for control of air pollution such as an urban area (a pollution-inhibited area) or an area low in the need for control of air pollution such as a suburb (pollution-non-inhibited area) and location information about battery-charging stations.

Further, the drive plan information input means 22 comprises, for example, a keyboard which the driver can operate to input drive plan information. By numbers or the like, the driver can input a destination to which the driver wants to drive, a planned charging point when the driver plans to charge the battery 1 on the way to the destination and moreover, drive route information if the driver wants to follow a specific drive route.

The functional construction of the controller 20 is designed as shown in FIG. 1. Namely, the controller 20 is provided with present position estimation means 23, best route selection means 24 and indication control means 25.

The present position estimation means 23 is designed to estimate the present position of the vehicle in predetermined cycles by using a GPS (Global Positioning System) 12. The GPS 12 comprises plural (at least three or more) GPS satellites 12A which transmit prescribed radio waves. These radio waves are received at a GPS receiver 14 via a GPS antenna 13 and based on the GPS information, the present position estimation means 23 estimates the present position of the vehicle.

Based on the road map information from the road map information storage means 21, specifically, based on the information about the present position of the vehicle and the information about the destination and, when information on planned charging points and drive routes have been inputted, also based on this information, the best route selection means 24 selects the best route between the present position and the destination and stores it as best route information.

The indication control means 25 processes the map information from the map information storage means 21, the best route information from the best route selection means 24 and the present position information from the present position estimation means 23 and feeds the resulting signals to a display (image display means) 26 and audio indication means 27 such as an audio system. Accordingly, the map information and best route information, including the present position, are shown on the display 26 and from the audio system or the like 27, audio information on navigation such as a change to the route is given.

In particular, the map information shown on the display 26 also includes information on the locations of battery-charging stations and such information as to permit distinguishing each area as to whether it is a pollution-inhibited area or a pollution-non-inhibited area. The audio information is designed in such a way that, when a planned charging point (a battery-charging station where charging is planned) is approached, the driver is advised so by a voice similarly to audio information about the navigation.

The controller 20 is also provided with additional functional elements, that is, area determination means 31, drive mode selection command means 32, needed-battery-capacity calculation means 33, reachability determination means 34 and use-conditions-limited reachability determination means 35.

Among these additional functional elements, the area determination means 31 determines, from the present position information from the present position estimation means 23 and the pollution inhibited/non-inhibited class information stored in the map information storage means 21, whether the present position of the vehicle is within a pollution-inhibited area; when the present position is not found to be within a pollution-inhibited area, whether the present position of the vehicle is within a predetermined distance of a pollution-inhibited area (in other words, within a zone close to a pollution-inhibited area) and whether any pollution-inhibited areas remain along the planned drive route from the present position of the vehicle to the destination of the planned charging point.

The drive mode selection command means 32 selects one of the drive modes of the electric automobile on the basis of information on the determination of the area determination means 31 and outputs a drive mode selection command signal to the above-described drive management controller 9.

Regarding the selection of the drive mode, the EV mode (the power-non-generating drive mode) is selected when the present position of the vehicle is determined to be within a pollution-inhibited area.

If the present position of the vehicle is determined to be outside a pollution-inhibited area but to be in a zone close to a pollution-inhibited area and the pollution-inhibited area remains along the remaining planned drive route to the destination or the planned charging point, the forced power-generating drive mode is selected until the remaining capacity of the battery 1 increases to a predetermined level (which is assumed to be a fully charged level in this embodiment). Although the predetermined level of the remaining capacity of the battery 1 has been set at the fully charged level in this embodiment, it may be contemplated that it could be set at a predetermined level lower than the fully charged level.

In other cases, namely, where the present position of the vehicle is within the zone close to the pollution-inhibited area and the pollution-inhibited area remains along the subsequent planned drive route to the destination or the planned charging point but the remaining capacity of the battery 1 has reached the predetermined level (the fully charged level), where the present position of the vehicle is within the zone close to the pollution-inhibited area but no pollution-inhibited area is found to remain along the subsequent planned drive route to the destination or the planned charging point, or where the present position of the vehicle is neither within the pollution-inhibited area or nor within the area close to the pollution-inhibited area, the HEV mode (the power-generating drive mode) is selected.

The need-battery-capacity calculation means 33 calculates, based on the distance of the best route between the present position and the destination or the planned charging point as selected by the best route selection means 24 and a preset average gas mileage (coverable distance per unit capacity of the battery), electric power (battery capacity) which is required to reach the destination or the planned charging point by driving the vehicle along the best route.

The reachability determination means 34 determines whether the vehicle can reach the destination or the planned charging point with the remaining capacity of the battery 1 detected by the remaining capacity meter 5. This determination can be conducted by comparing the needed battery capacity calculated by the needed-battery-capacity calculation means 33 with the remaining capacity of the battery 1 detected by the remaining capacity meter 5. Described specifically, the vehicle can be determined to be able to reach the destination or the planned charging point with the present remaining capacity if the remaining capacity of the battery 1 is equal to or greater than the needed battery capacity but can be determined to be unable to reach the destination or the planned charging point with the present remaining capacity if the remaining capacity of the battery 1 is smaller than the needed battery capacity.

However, in view of a possible error in the estimation of a remaining capacity, a potential error in the calculation of a needed battery capacity, and the like, it is more appropriate to design the reachability determination means 34, for example, in such a way that the vehicle is determined to be able to reach the destination or the planned charging point when the remaining capacity of the battery 1 is greater by a predetermined quantity or more than the needed battery capacity but is determined to be unable to reach the destination or the planned charging point when the remaining capacity of the battery 1 is not greater by a predetermined quantity or more than the needed battery capacity.

The determination results of the reachability determination means 34 are sent to the indication control means 25 and are displayed as an image on the display 26 or indicated by a voice through the audio system or the like 27. Especially, when the vehicle is determined to be unable to reach the destination or the planned charging point, the indication is controlled via the indication control means 25 so that a message is given to the driver to the effect that the driver is advised of the need for resetting of the planned charging point on the way to the destination and the need for limitations to the drive route via the drive plan information input means 22.

Further, the reachability determination means 34 also determines during the driving whether the vehicle can reach the destination or the planned charging point in response to variations in the remaining driving distance and the remaining capacity of the battery 1. There may be such a situation that the remaining capacity of the battery 1 becomes insufficient in the course of driving although the battery 1 has a sufficiently high remaining capacity at a start, for example, when the power consumption of the battery 1 is greater than a standard due to a traffic jam or the like. If the situation changes from a reachable situation to an unreachable situation in the course of driving as described above, the reachability determination means 34 displays an image or indicates by a voice to that effect (the unreachability) via indication means such as the display 26 or the audio system 27 and further displays via the display means one or more charging points (battery-charging stations) which are located on the way to the destination or the planned charging point and are reachable by the vehicle with the present remaining capacity of the battery.

The use-conditions-limited reachability determination means 35 is actuated when no resetting is made within a predetermined time despite the determination by the reachability determination means 34 that the vehicle cannot reach the destination or the planned charging point with the present remaining capacity. To permit use of the battery 1 while economizing on electric power, this use-conditions-limited reachability determination means 35 sets use conditions for the motor 2 and accessories (not shown) and determines whether the vehicle can reach the destination or the planned charging point under the use conditions so set for the motor and accessories.

As use conditions for the motor 2, it can be contemplated that a limit with respect to a maximum torque of the motor 2 during driving of the vehicle be set so that the motor 2 is operated within the thus-limited maximum torque to enable the vehicle to be driven at a lower fuel consumption. As examples of the accessories, an air conditioner, lights, a radio and the like can be considered. As use conditions for these accessories, it can be contemplated, for example, that operation of the air conditioner be restricted and/or use of the lights be limited to that minimally necessary.

The use-conditions-limited reachability determination means 35 then determines whether the vehicle can reach the destination or the planned charging point if the vehicle is driven with the motor 2 operated within the thus-limited maximum torque and with the accessories used under the so-limited use conditions. The use-conditions-limited reachability determination means 35 can also be designed to set only a use condition for the motor 2 and then to determine whether the vehicle can reach the destination or the planned charging point under the use condition for the motor 2 or as an alternative, to set only use conditions for the accessories and then to determine whether the vehicle can reach the destination or the planned charging point under the use conditions for the accessories.

Here again, in view of a possible error in the estimation of a remaining capacity, a potential error in the calculation of a needed battery capacity, and the like, it is more appropriate to design the use-conditions-limited reachability determination means 35, for example, in such a way that the vehicle is determined to be able to reach the destination or the planned charging point when the remaining capacity of the battery 1 is greater by a predetermined quantity or more than the needed battery capacity under the use condition for the motor but is determined to be unable to reach the destination or the planned charging point when the remaining capacity of the battery 1 is not greater by a predetermined quantity or more than the needed battery capacity under the use condition for the motor.

The determination results of the use-conditions-limited reachability determination means 35 are also sent to the indication control means 25 and are displayed as an image on the display 26 or indicated by a voice through the audio system or the like 27. Especially, when the vehicle is determined to be unable to reach the destination or the planned charging point despite the addition of the use conditions, a battery-charging station closest to the present position of the vehicle is shown on the display 26 via the indication control means 25 so that the driver can be guided to modify the drive plan to give priority to the charging of the battery 1.

For instance, if there is a battery-charging station on a map already shown on the display 26, it may be contemplated that the driver's attention be directed to the battery-charging station, for example, by causing it to flicker. If there is no battery-charging station on the map shown on the display 26, it may be contemplated that on the display 26 a map be shown, which shows a greater area than the first-mentioned map and includes a battery-charging station close to the present position of the vehicle, and then that the driver's attention be directed to the battery-charging station, for example, by causing it to flicker.

As the navigation system according to the first embodiment of the present invention for the electric automobile is constructed as described above, the following operation is performed upon driving the vehicle.

Figure 3:
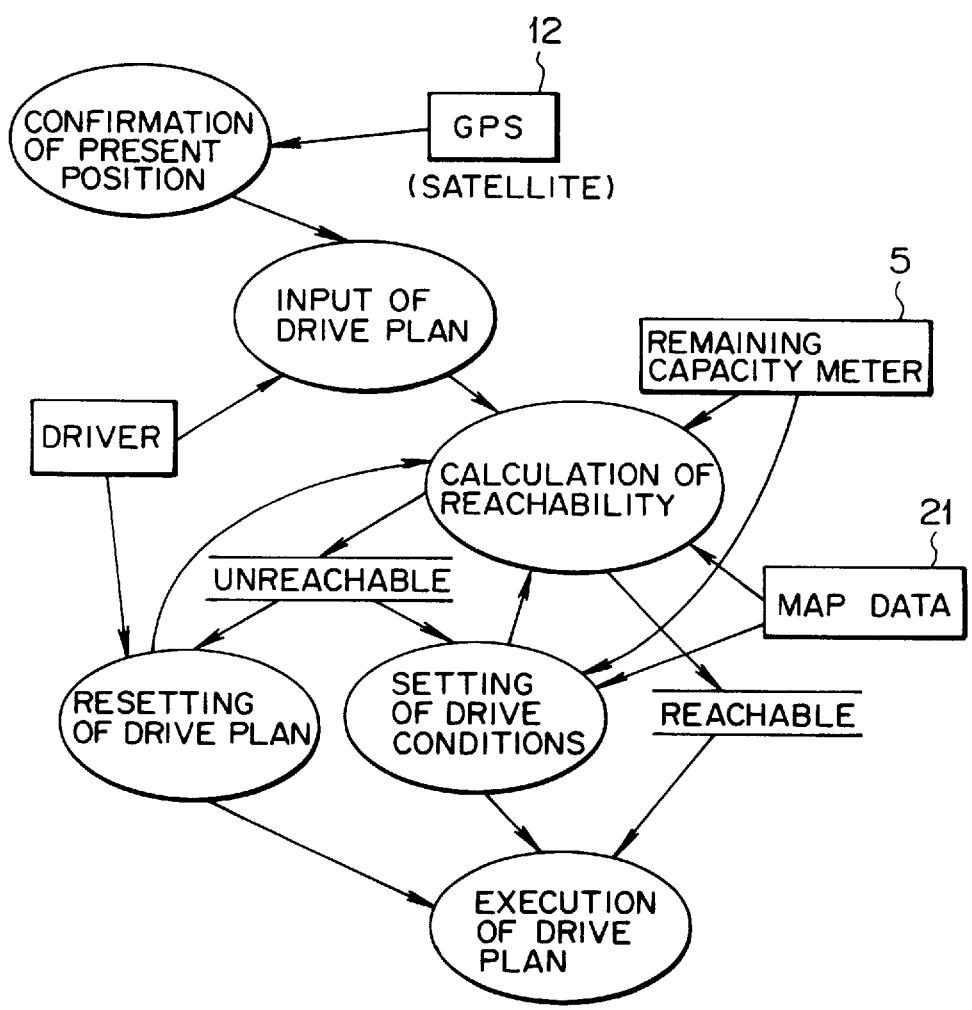
FIG. 3 is a diagram illustrating operation of the navigation system according to the first embodiment for the electric automobile.

Describing the outline of the operation first, an unillustrated input switch of the navigation system is turned on upon starting a drive and, as illustrated in FIG. 3, a drive plan is set based on an input operation by the driver.

Namely, the present position is confirmed by actuating the navigation system. Described specifically, the present position estimation means 23 initiates estimation of the present position of the vehicle by using the GPS 12 and based on the present position of the vehicle so estimated, shows the present position of the vehicle together with surrounding map information on the display 26 subsequent to processing at the indication control means 25.

The driver then inputs a drive plan via the drive plan information input means 22. Described specifically, inputted, for example by numbers, are a destination to which the driver wants to drive, a planned charging point if charging of the battery 1 is planned on the way to the destination, and drive route information if the driver wants to limit the drive route to a particular drive route. The best route selection means 24 selects the best route between the present position and the destination on the basis of information on the present position of the vehicle, information on the destination, the planned charging point and information on the drive route.

Then, calculation is performed to determine the reachability. For this purpose, the needed-battery-capacity calculation means 33 performs calculation on the basis of the map information (the distance of the selected best route) to determine the reachability, namely, calculation of a battery capacity required to reach the destination or the planned charging point. The reachability determination means 34 then compares the remaining capacity of the battery 1 detected by the remaining capacity meter 5 with the needed battery capacity calculated by the needed-battery-capacity calculation means 33 to determine whether the vehicle can reach the destination or the planned charging point.

If the vehicle is determined to be able to reach the destination or the planned charging point, the drive plan is then executed. If determined to be unable to reach the destination or the planned charging point, information is displayed via the indication control means 25 to advise the need for resetting the drive plan. The driver, therefore resets the drive plan when the vehicle is determined to be unable to reach the destination or the planned charging point. Namely, a planned charging point on the way to the destination, a limitation to the drive route or the like is reset, or cancellation of a limitation or the like to the drive route is performed. Here again, the best route selection means 24 newly selects the best route between the present position and the destination on the basis of the drive plan so reset.

By the needed-battery-capacity calculation means 33 and the reachability determination means 34, calculation is performed again to determine the reachability. As a result, the drive plan executed if the vehicle is determined to be able to reach the destination or the planned charging point. If the vehicle is determined to be still unable to reach the destination or the planned charging point, information is again indicated via the indication control means 25 to advise the need for a further resetting of the drive plan.

In this manner, setting of a drive condition, namely, setting of a use condition for the motor 2 is performed when the vehicle is determined to be unable to reach the destination or the planned charging point. Described specifically, the use-conditions-limited reachability determination means 35 sets use conditions for the motor 2 and accessories to permit use of the battery 1 while economizing on electric power and then determines whether the vehicle can reach the destination or the planned charging point under the use conditions so set for the motor and accessories.

As a result, if the vehicle is determined to be able to reach the destination or the planned charging point, the drive plan is then executed. If it is determined to be unable to reach the destination or the planned charging point, information is displayed again via the indication control means 25 to advise the need for a still further resetting of the drive plan. In this case, it is contemplated that the drive plan be changed so that the vehicle is promptly driven to a nearby battery-charging station and after charging the battery, is driven on further to the destination.

After making the vehicle reachable to the destination or the planned charging point as described above, the drive plan is executed.

Figure 4:
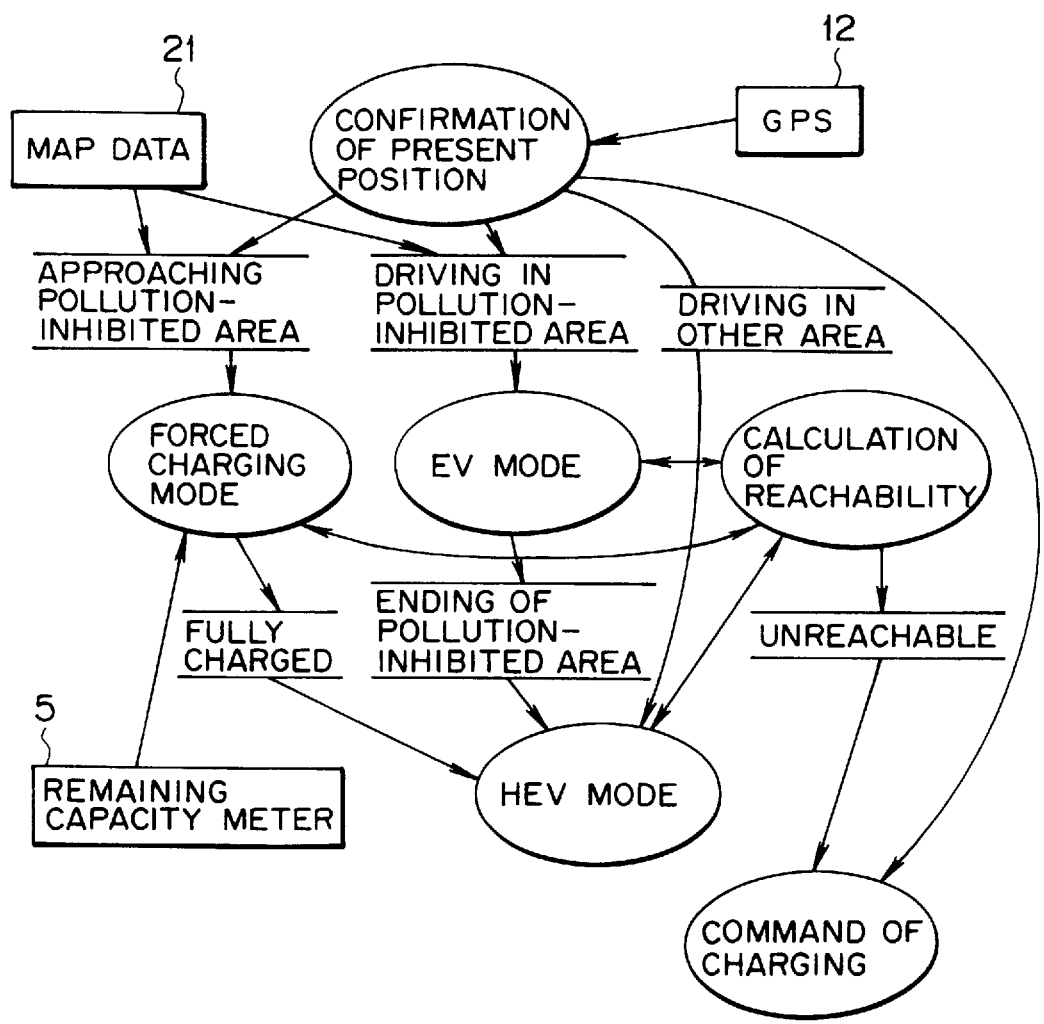
FIG. 4 is a diagram illustrating another operation of the navigation system according to the first embodiment for the electric automobile.

On the other hand, the execution of the drive plan can be carried out as shown in FIG. 4.

During driving, the present position estimation means 23 performs estimation of the present position of the vehicle (confirms the present position) in predetermined cycles by using the GPS 12. The area determination means 31 determines, from information on the present position and map data (class information as to whether or not each area is a pollution-inhibited area) stored in the map information storage means 21, whether the present position of the vehicle is within a pollution-inhibited area, and if not determined to be within any pollution-inhibited area, determines whether the vehicle is in a zone close to a pollution-inhibited area.

The drive mode selection command means 32 selects the EV mode (power-non-generating drive mode) if the present position of the vehicle is determined to be within a pollution-inhibited area, selects the forced charging mode (forced power-generating drive mode) if the present position of the vehicle is not determined to be within a pollution-inhibited area but determined to be within a zone close to a pollution-inhibited area, and selects the HEV mode (power-generating drive mode) if the present position of the vehicle is determined to be within another area (namely, neither within a pollution-inhibited area nor within a zone close to a pollution-inhibited area).

In the forced charging mode, the remaining capacity of the battery 1 detected by the remaining capacity meter 5 is monitored and, when the battery 1 is found to have been fully charged, the drive mode is changed over from the forced charging mode to the HEV mode. Needless to say, when the vehicle has entered from a pollution-inhibited area to an area which is neither a pollution-inhibited area nor a zone close to a pollution-inhibited area, the drive mode is changed over from the EV mode to the HEV mode.

Further, when the present position of the vehicle has approached the planned charging point, charging is instructed.

Further, the reachability determination means 34, even during driving, calculates and determines whether the vehicle can reach the destination or the planned charging point in response to the remaining driving distance and a variation in the remaining capacity of the battery 1. If the results of the determination are changed to indicate unreachability, this unreachability is displayed and charging is instructed. Here, one or more charging points (battery-charging stations), which are located on the way to the destination or the planned charging point and reachable by the vehicle with the present remaining capacity of the battery, are displayed for the driver's attention.

Now, such operation of the navigation system will be described further with reference to the flow charts of FIG. 5 through FIG. 10.

Figure 5:
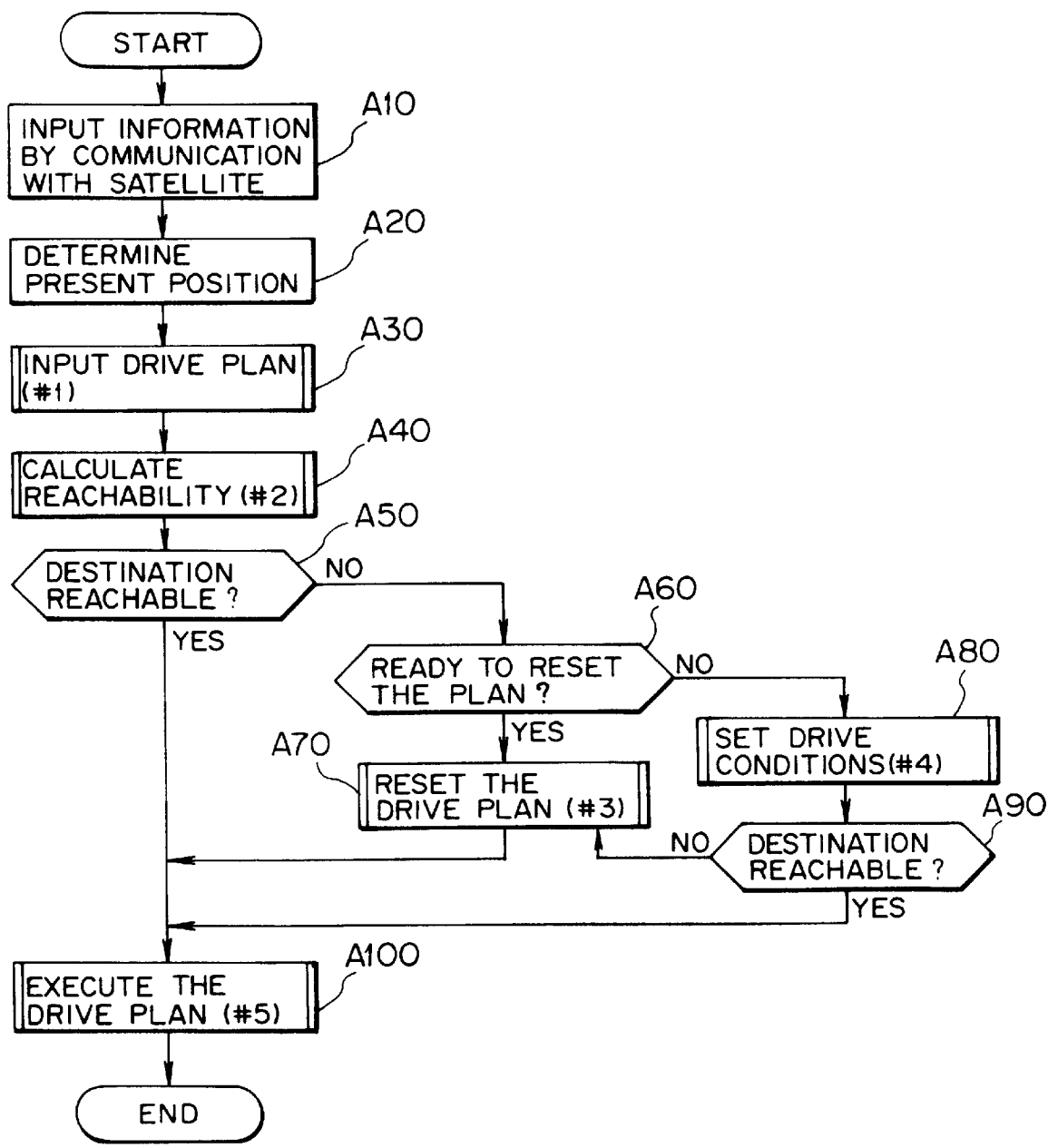
FIG. 5 is a flow chart illustrating further operation of the navigation system according to the first embodiment for the electric automobile.

The procedures from the setting of a drive plan to the execution of the drive plan are carried out by such processing as depicted in the main flow chart of FIG. 5.

First, GPS information is inputted (through communication with satellites) (step A1) and based on the GPS information, the present position of the vehicle is determined (step A20). The GPS information is inputted by receiving at the GPS receiver 14 radio waves from such GPS satellites 12A via the GPS antenna 13. The determination of the present position is carried out by the present position estimation means 23 and information on the present position of the vehicle is shown together with its surrounding map information on the display 26.

Next, the driver inputs a drive plan via the drive plan information input means 22 (step A30). This input is executed as shown in the drive plan input routine of FIG. 6. Described specifically, the driver first inputs a destination to which the driver wants to drive the vehicle (step A32). Further, if necessary, a planned charging point (charging point) on the way to the destination is inputted (step A34) and a drive route is inputted (step A36). At the best route selection means 24, on the other hand, the best route between the present position and the destination is selected and stored based on information about the present position of the vehicle, information about the destination and information about the planned charging point and the drive route.

In step A40 (see FIG. 5), calculation is then performed to determine the reachability. This calculation is performed as shown in the reachability determination routine of FIG. 7. Described specifically, a remaining capacity of the battery 1 is first detected by the remaining capacity meter 5 (step A42). Based on the map information, the distance to the destination or the planned charging point (the driving distance) is then calculated by the needed-battery-capacity calculation means 33 (step A44). Based on the driving distance so calculated, a battery capacity required to drive this distance (driving electric-power consumption) is calculated (step A46). At the reachability determination means 34, a comparison is made between the remaining capacity of the battery 1 detected by the remaining capacity meter 5 and the needed battery capacity (driving electric-power capacity) calculated by the needed-battery-capacity calculation means 33, thereby determining whether the vehicle can reach the destination or the planned charging point (step A48).

In step A50 (see FIG. 5), the reachability to the destination is then determined. This can be performed based on the determination results of step A48. If the vehicle is determined to be reachable to the destination, the drive plan is carried into execution (step A100). Otherwise, it is determined whether it is in a state ready for resetting the drive plan (step A60).

Namely, unless the vehicle is determined to be able to reach the destination, it is generally in a state ready for resetting the drive plan. The routine therefore advances to step A70. If the driver does not perform resetting even after a predetermined time has elapsed since the display of the need for reset, it is determined not to be in a state ready for resetting the drive plan, and the routine then advances to step A80.

Figure 6:
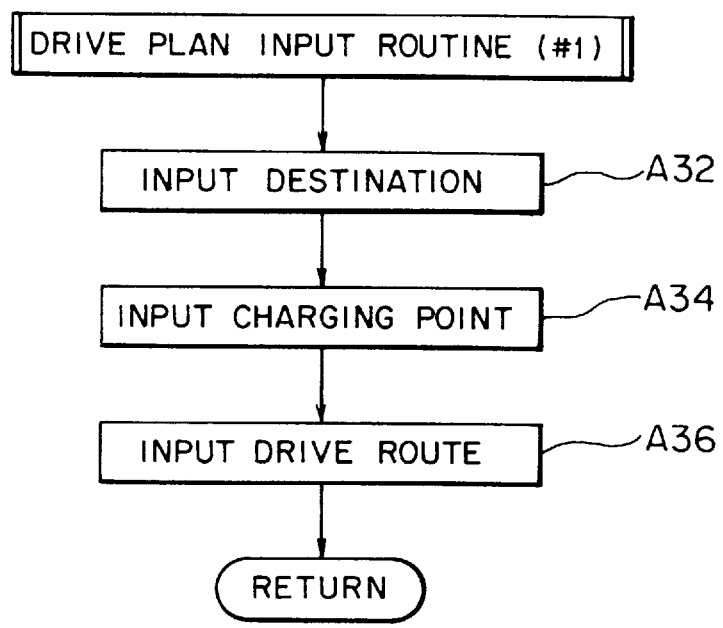
FIG. 6 is a flow chart illustrating further operation of the navigation system according to the first embodiment for the electric automobile along a routine.
Figure 7:
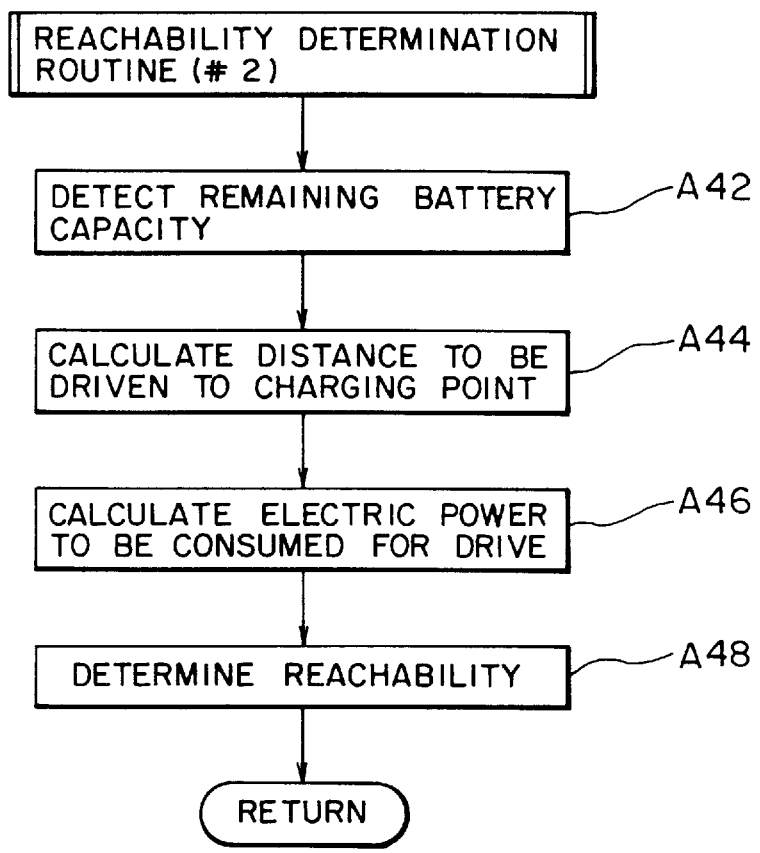
FIG. 7 is a flow chart illustrating further operation of the navigation system according to the first embodiment for the electric automobile along another routine.
Figure 8:
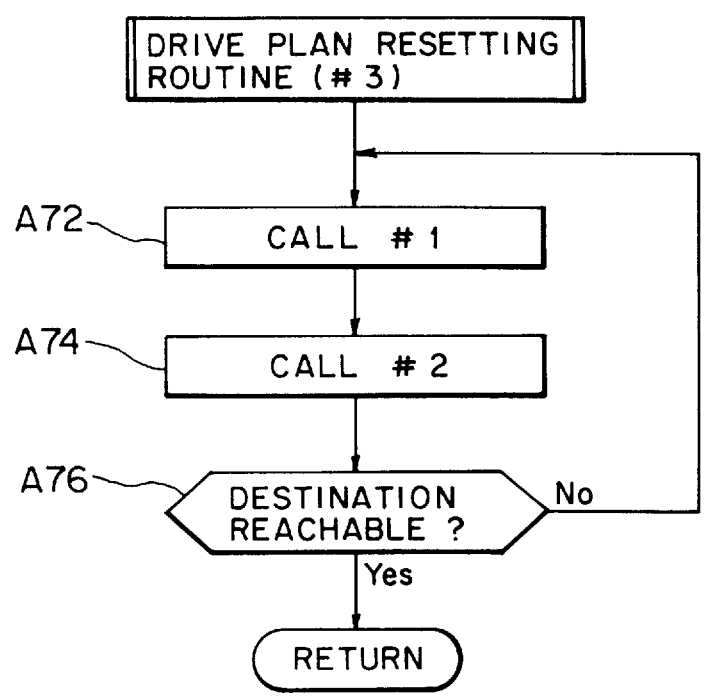
FIG. 8 is a flow chart illustrating further operation of the navigation system according to the first embodiment for the electric automobile along a further routine.

In step A70, processing is performed as shown in the resetting routine of FIG. 8. A drive plan input routine is first executed as illustrated in FIG. 6 (step A72), followed by the execution of a reachability determination routine as depicted in FIG. 7 (step A74). Resetting is generally repeated until the vehicle is determined to be able to reach the destination in step A76.

If the vehicle is determined to be able to reach the destination by the resetting processing in step A70 as described above (see FIG. 5), execution of the drive plan is performed (step A100).

Figure 9:
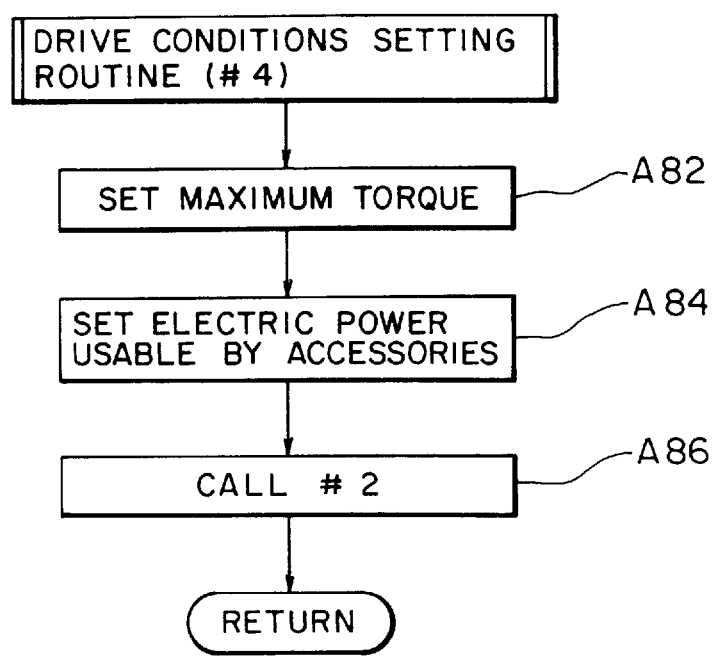
FIG. 9 is a flow chart illustrating further operation of the navigation system according to the first embodiment for the electric automobile along a still further routine.

In step A80, on the other hand, processing is executed as shown in the drive condition setting routine of FIG. 9. Described specifically, the use-conditions-limited determination means 35 sets, as a use condition for the motor 2 to permit use of the battery 1 while economizing on electric power, a limiting value with respect to the maximum torque of the motor 2 during driving of the vehicle (step A82). Then, a limitation is set to electric power which is usable by accessories (step A84). Based on these settings of the maximum torque and the electric power usable by the accessories, the reachability determination routine is performed again as shown in FIG. 7 (step A74).

If the vehicle is determined to be able to reach the destination by the drive condition setting processing in step A80 (see FIG. 5), the drive plan is executed (step A100). In this case, the vehicle is driven while limiting operation of the motor and operations of the accessories on the basis of the settings of the maximum torque and the electric power usable by the accessories. If the vehicle is not determined to be able to reach the destination even by the drive condition setting processing in step A80 (see FIG. 5), the driver is advised to perform resetting again (step A70). As such advice, a change to the drive plan so that the driver would drive on to the destination after promptly driving to the nearby battery-charging station and charging the battery there may be contemplated.

Figure 10:
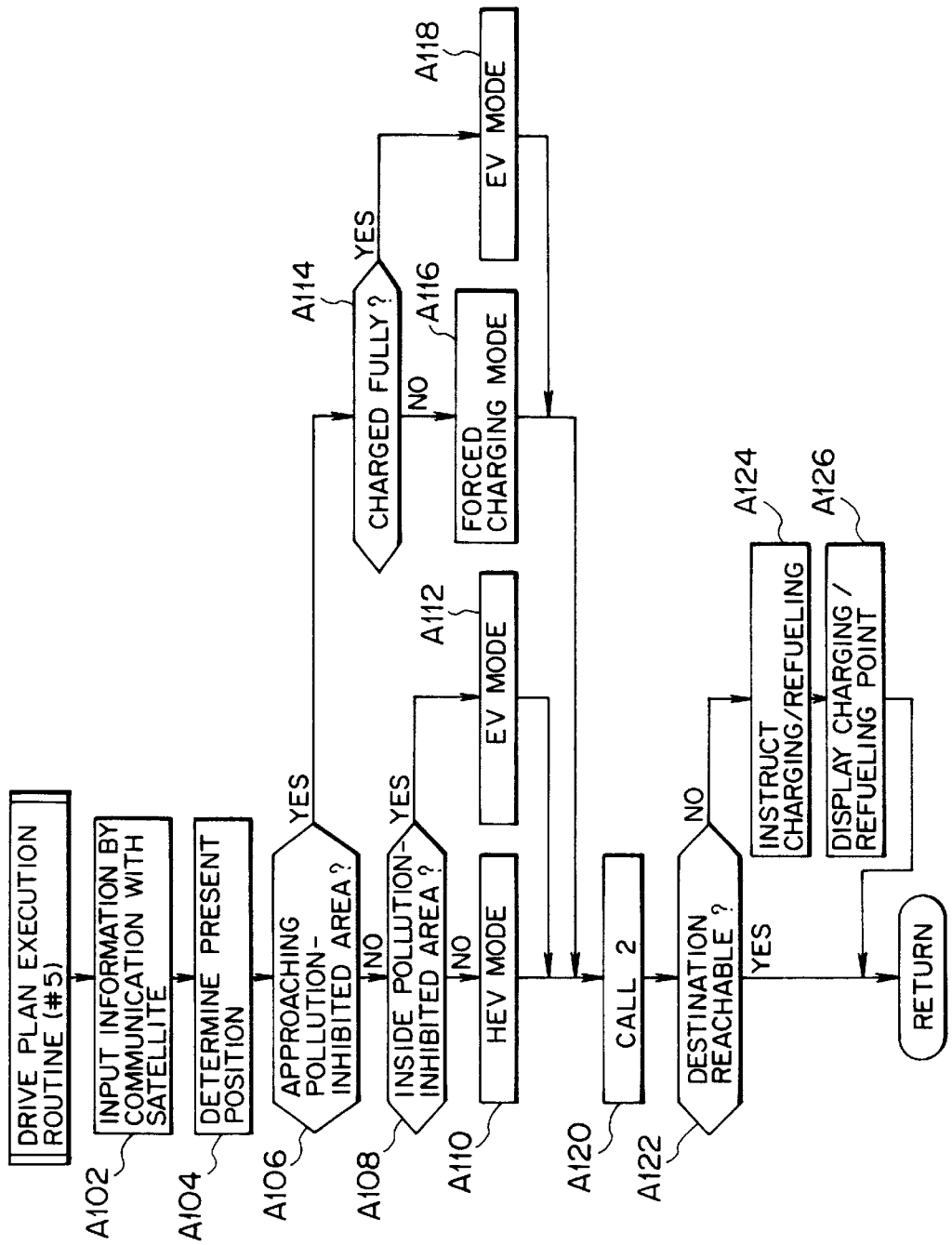
FIG. 10 is a flow chart illustrating operation of the navigation system according to the first embodiment for the electric automobile along a still further routine.

After the drive plan is inputted as described above, the drive plan is then executed (see step A100). This processing is performed as illustrated in FIG. 10.

Described specifically, during a drive, GPS information is inputted through communication with the satellites (step A102) and based on this GPS information, the present position of the vehicle is determined (step A104). From information about the present position of the vehicle and the map data (the class information as to whether or not each area is a pollution-inhibited area) stored in the map information storage means 21, the area determination means 31 determines whether the present position of the vehicle is within a zone close to a pollution-inhibited area (step A106). If the present position of the vehicle is determined to be within a zone close to a pollution-inhibited area, the routine then advances to step A114 to select the forced charging mode (the forced power-generating drive mode) or the EV mode (the power-non-generating mode). Namely, whether or not battery 1 is in a fully-charged state is first determined based on a remaining capacity of the battery 1 detected by the remaining capacity meter 5 (step A114). If the battery is determined to be in the fully-charged state, the EV mode is selected (Step A118). Otherwise, the forced generating mode is selected (step A116).

On the other hand, if the present position of the vehicle is not in a zone close to a pollution-inhibited area, it is then determined whether the present position of the vehicle is within any pollution-inhibited area (step A108).

If the present position of the vehicle is determined to be within a pollution-inhibited area, the EV mode (the power-non-generating drive mode) is selected (step A112). If the present position of the vehicle is not determined to be within a pollution-inhibited area (in other words, if the present position of the vehicle is determined to be neither within a pollution-inhibited area nor within a zone close to a pollution-inhibited area), the HEV mode (the power-generating drive mode) is selected (step A110).

Although operations of the motor 2, the alternator 6 and the dynamo engine 7 are controlled via the drive management controller 9 in the drive mode selected as described above, the reachability determination routine shown in FIG. 7 is executed by the reachability determination means 34 (step A120).

If the reachability of the vehicle changes into an unreachable state in the course of the drive due to a change in the remaining driving distance or the remaining capacity of the battery 1, the routine advances to step A124 subsequent to the determination in step A122. An indication is then made to that effect and charging is instructed, and further, a charging point is displayed to the driver (step A126). If refueling is needed at this point as shown in step A126, it is also possible to advise this accordingly.

As has been described above, the navigation system for the electric automobile makes it possible to smoothly drive to the destination without causing the battery 1 to go flat while adequately controlling the remaining capacity of the battery 1. In particular, a charging point can be properly indicated by making use of the map information stored in the navigation system. It is therefore possible for anybody to drive the vehicle while easily controlling the remaining capacity of the battery 1.

There is a further advantage that the charging point can be plainly advised by using an image display or audio indication means which is employed in the navigation system.

Figure 11:
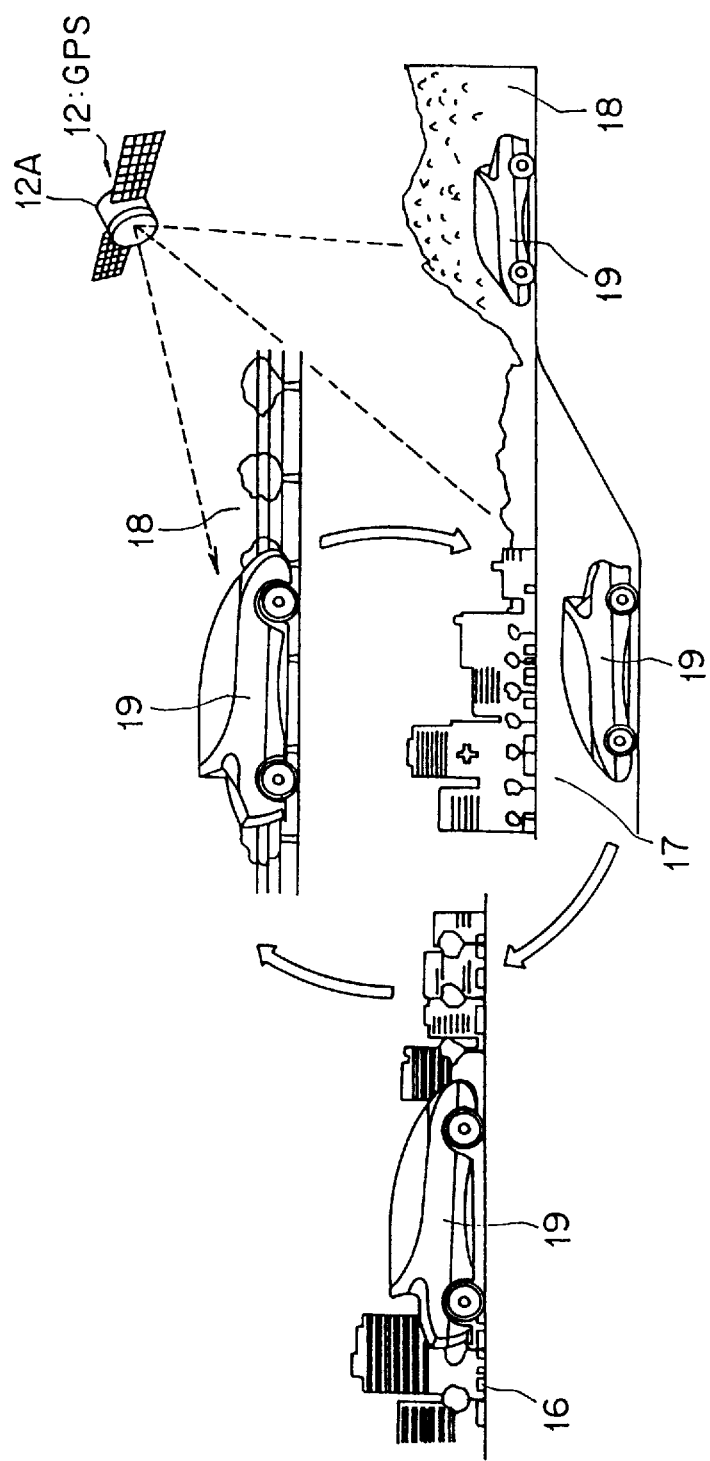
FIG. 11 is a schematic illustration showing how the drive mode of a hybrid electric automobile with a navigation system according to a second embodiment of the present invention mounted thereon is changed over.

As is illustrated in FIG. 11, when driving within a pollution-inhibited area 16, the hybrid electric automobile with the automobile navigation system mounted thereon makes it possible to ensure driving in the EV mode while receiving information from the GPS 12. It is therefore possible to avoid air pollution. Even outside the above area, that is, within a pollution-non-inhibited area, the forced charging mode is selected within a zone close to the pollution-inhibited area (i.e., a pollution-inhibited-area approaching zone) 17 so that the capacity of the battery 1 can be retained sufficiently. This makes it possible to pleasantly and confidently ensure driving in the EV mode within the pollution-inhibited area. Within a pollution-non-inhibited area 18, the vehicle is driven in the HEV mode only when needed, thereby making it possible to extend the coverable distance with a small battery capacity while reducing air pollution.

Needless to say, upon braking, braking energy can be utilized to generate electric power by regenerative braking irrespective of the area class, thereby making it possible to increase the coverable distance. Incidentally, numeral 19 indicates the hybrid electric automobile.

As a consequence, it is possible to extend the coverable distance with a small battery capacity while effectively avoiding air pollution. The hybrid electric automobile can therefore be provided with substantially-improved practical utility.

Although the present embodiment has been described in regard to the series hybrid vehicle, the construction of the present embodiment can also be applied to parallel hybrid vehicles.

Figure 12:
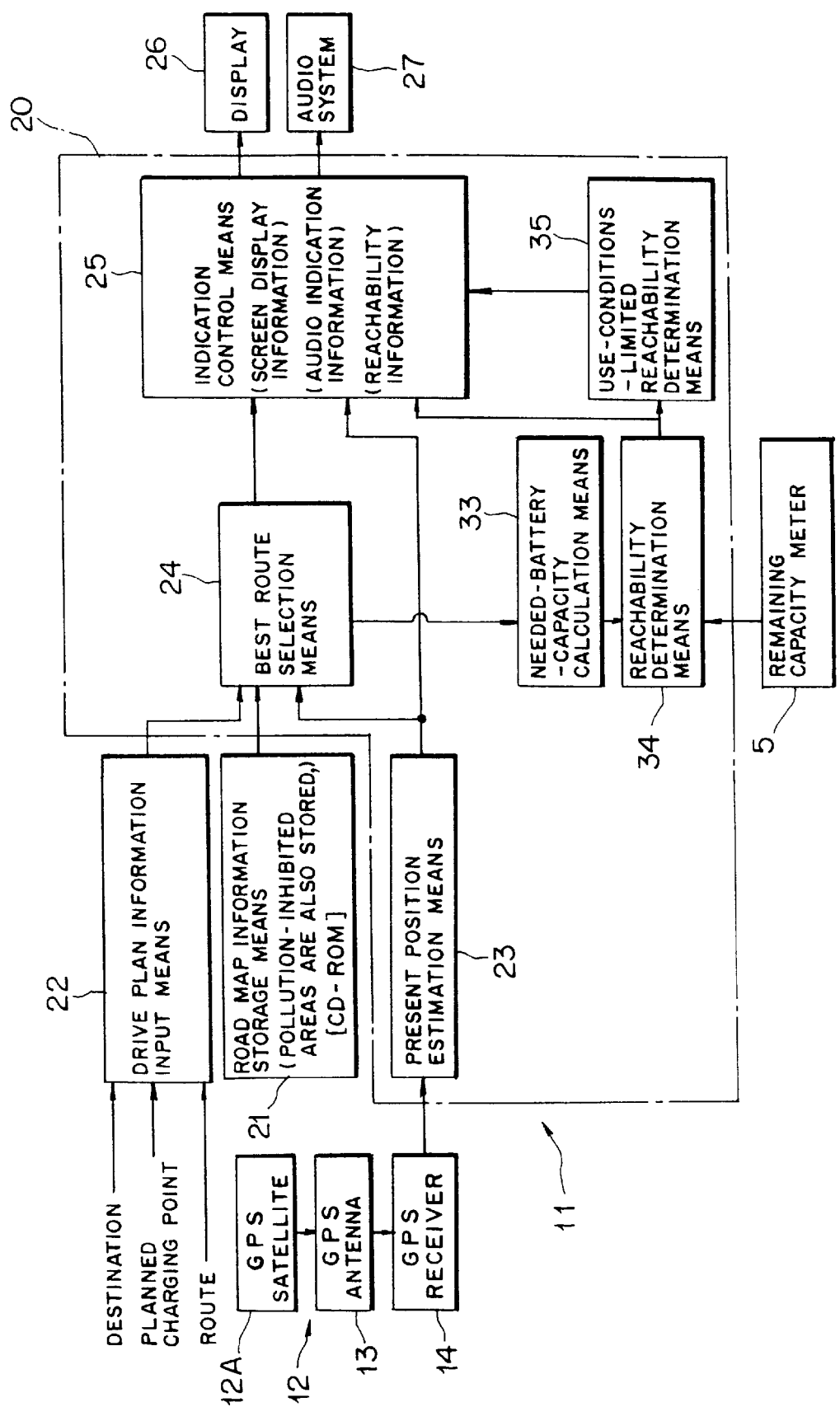
FIG. 12 is a block diagram schematically illustrating the functional construction of the navigation system according to the second embodiment for the electric automobile.
Figure 13:
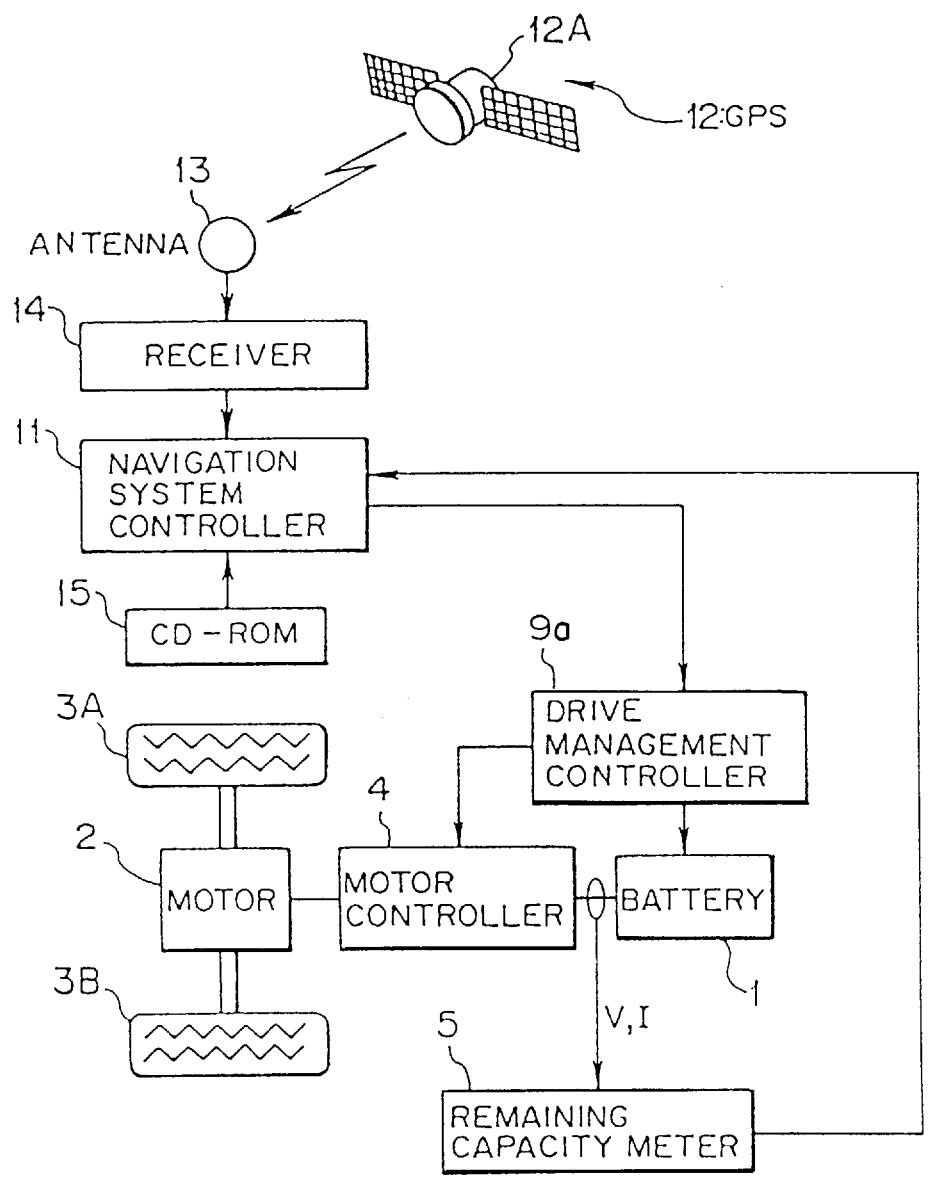
FIG. 13 is a schematic block diagram of the electric automobile with the navigation system according to the second embodiment mounted thereon.

A description will next be made of the second embodiment. The navigation system according to the second embodiment is mounted on an electric automobile equipped with no internal combustion engine as illustrated in FIG. 13. Since the vehicle is driven only in the EV mode, the navigation system has the same construction as that of the first embodiment except for the omission of the area determination means 31 and the drive mode selection command means 32 as depicted in FIG. 12. Further, as is illustrated in FIG. 13, the alternator 6 and the engine 7 have been excluded and the HEV/EV drive management controller 9 has been changed to a drive management controller 9A. The function of the drive management controller 9A is the same as that of the HEV/EV drive management controller 9 in the EV mode. As the remaining elements are constructed as in the first embodiment, their description is omitted herein.

Figure 14:
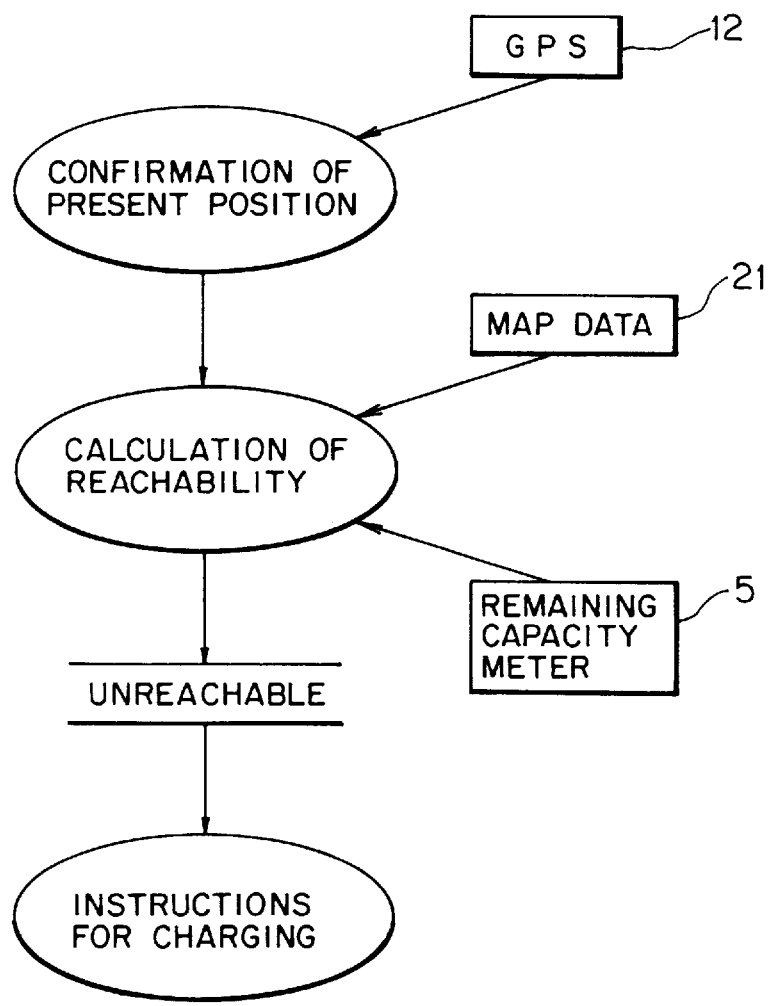
FIG. 14 is a diagram illustrating operation of the navigation system according to the second embodiment for the electric automobile.

Since the automobile navigation system according to the second embodiment of the present invention is constructed as described above, an unillustrated input switch of the navigation system is turned on upon driving the vehicle, that is, at the time of initiation of a drive, and as in the first embodiment, that, as is illustrated in FIG. 3, a drive plan is set based on an input operation by the driver. Upon execution of the drive plan, however, the drive plan is executed as shown in FIG. 14.

During the drive, the present position estimation means 23 estimates (i.e., confirms) the present position of the vehicle in a predetermined cycle by using the GPS 12. In the course of the drive, responsive to each change in the remaining driving distance available from the present position and map information or in the remaining capacity of the battery 1, the reachability determination means 34 calculates and determines whether the vehicle can reach a destination or a planned charging point. If the reachability of the vehicle is found to have changed into an unreachable state as a result of the above determination, the navigation system indicates so and instructs charging.

Figure 15:
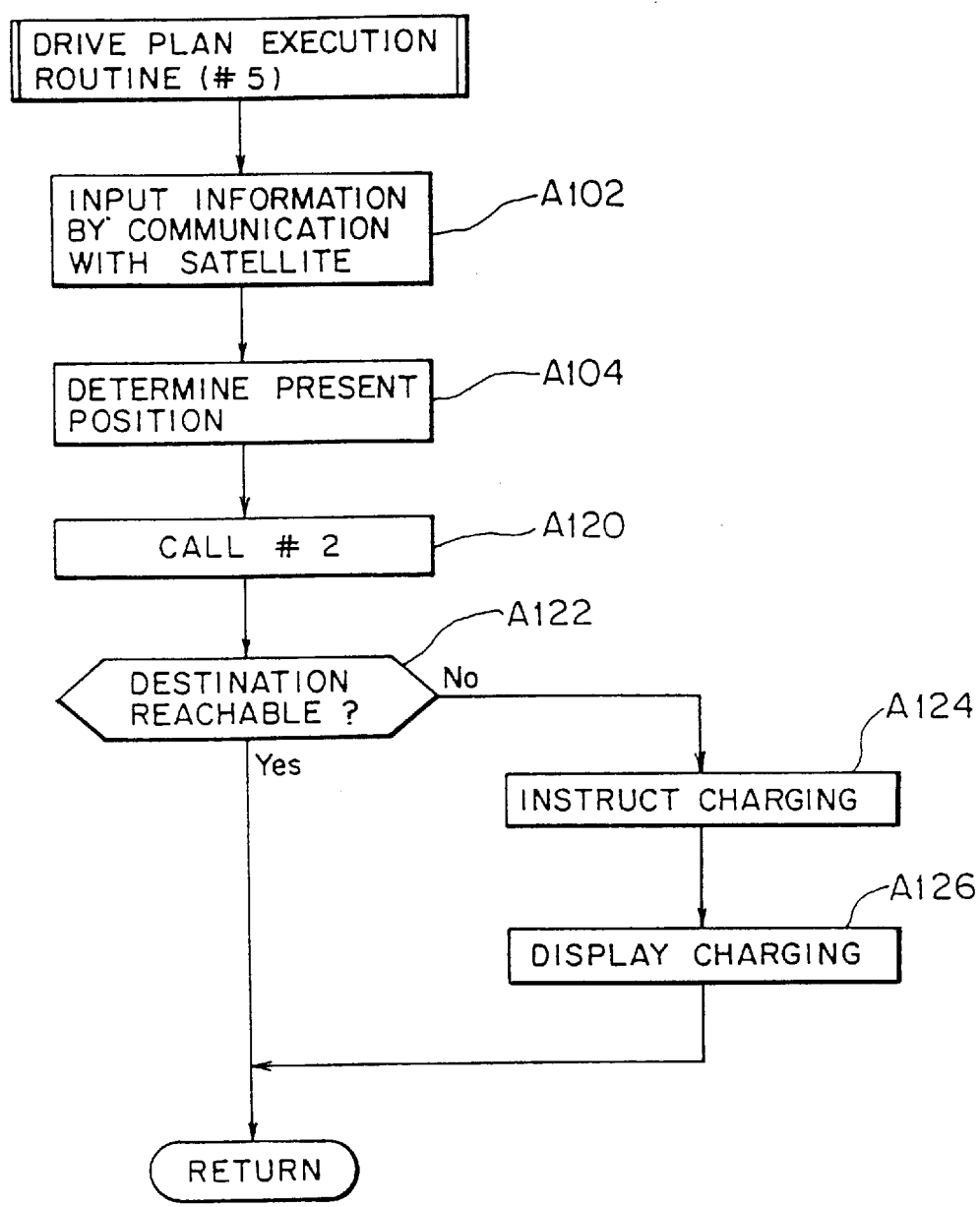
FIG. 15 is a flow chart illustrating another operation of the navigation system according to the second embodiment for the electric automobile.

Operation of the navigation system during the drive can be illustrated as shown in the flow chart of FIG. 15. Although FIG. 15 corresponds to FIG. 10 of the first embodiment, steps A106 to A118 which relate to the drive modes are omitted.

As is shown in FIG. 15, during the drive, GPS information is inputted through communication with satellites (step A102). Based on the GPS information, the present position of the vehicle is determined (step A104). By the reachability determination means 34, the reachability determination routine shown in FIG. 7 is then executed (step A120).

If the reachability of the vehicle changes into an unreachable state in the course of the drive due to a change in the remaining driving distance or the remaining capacity of the battery 1, the routine advances to step A124 subsequent to the determination in step A122. An indication is then made to that effect and charging is instructed, and further, a charging point is displayed to the driver (step A126).

According to the automobile navigation system of the second embodiment, it is possible, as in the first embodiment, to smoothly drive to the destination without causing the battery 1 to go flat while properly controlling the remaining capacity of the battery 1. Needless to say, a charging point can be properly advised while using the map information stored in the navigation system. It is therefore possible for anybody to drive the vehicle while easily controlling the remaining capacity of the battery 1. There is a further advantage that the charging point can be plainly advised by using an image display or audio indication means which is employed in the navigation system.

The measurement of a position of the vehicle can be conducted, for example, using self-contained navigation instead of the satellite navigation or in combination with the satellite navigation. According to this self-contained navigation, the position of the vehicle is estimated by measuring changes in the moved distance and moved direction of the vehicle and combining them together. As an alternative, it is also possible to use a speed or revolution number of a wheel for the calculation of a moved distance of the vehicle and to employ a yaw angular speed of the vehicle for the calculation of a moved direction of the vehicle. To perform the self-contained navigation, pieces of information from a wheel speed sensor, various gyroscopes, geomagnetism sensors and the like are inputted to the navigation system 11 and are used for the estimation of the position of the vehicle.

We claim:

1. A navigation system for an electric automobile having a battery, an electric drive motor for driving wheels by electric power from said battery, motor control means for controlling operation of said electric drive motor by adjusting electric power fed to said electric drive motor in accordance with an output demand operation, and remaining capacity detection means for detecting a remaining capacity of said battery, the navigation system comprising:

road map information storage means for storing road map information;

drive plan information input means for inputting drive plan information including a destination of said automobile;

present position detecting means for detecting a present position of said automobile;

indication control means for controlling at least one of screen display information and audio indication information of map information and route information on the basis of information from said road map information storage means, said drive plan information input means, and said present position detecting means;

reachability determination means for determining, based on a distance planned to be driven by said automobile from the detected present position to said destination and said remaining capacity of said battery determined by said remaining capacity detection means, whether said automobile can reach said destination with said remaining capacity of said battery; and use-condition-limited reachability determination means for limiting use of electrical power to extend a driving range of said automobile.

2. The navigation system according to claim 1, wherein said drive plan information further includes, a planned charging point at which charging of said battery is planned along a route to said destination, and said reachability determination means includes means for determining, based on a distance planned to be driven by said automobile to said planned charging point and said remaining capacity of said battery determined by said remaining capacity detection means, whether said automobile can reach said planned charging point with said remaining capacity of said battery.

3. The navigation system according to claim 1, wherein said use-condition-limited reachability determination means sets, when said automobile is determined to be unable to reach said destination by said reachability determination means, a use condition for any one of said electric drive motor and an accessory to permit use of said battery while economizing on electric power and then determining whether said automobile can reach said destination under the so-set motor use condition.

4. The navigation system according to claim 1, further comprising:

indication means for indicating unreachability of said automobile when said automobile is determined to be unable to reach said destination by said reachability determination means.

5. The navigation system according to claim 1, further comprising:

indication means for indicating the need for change in and reset of said drive plan information when said automobile is determined to be unable to reach said destination by said reachability determination means.

6. The navigation system according to claim 1, wherein said drive plan information further includes, a plurality of charging points available along said route to said destination, and said navigation system further includes display means for displaying at least one of said available charging points, to which said automobile is found to be reachable by said reachability determination means, when said automobile is determined to be unable to reach said destination by said reachability determination means.

7. The navigation system according to claim 1, wherein said reachability determination means includes means for determining whether said vehicle can reach said destination at the time of input of said drive plan information and also in response to variations in the remaining capacity of said battery during travelling of said automobile.

8. The navigation system according to claim 1, wherein said electric automobile further includes, an alternator connected to said battery to permit charging of said battery, a dynamo head engine for driving said alternator, and heat engine control means for controlling operation of said heat engine, whereby said automobile is constructed as a hybrid electric automobile having, as drive modes, a power-generating drive mode in which said automobile is driven while operating said alternator as needed and a power-non-generating drive mode in which said automobile is driven only by electric power charged in said battery without operating said alternator; and said navigation system further includes, pollution-inhibited area storage means containing information on a pollution-inhibited area corresponding to said road map information, area determination means for determining, based on information from said present position detection means and said pollution-inhibited area storage means, whether said present position of said automobile is in said pollution-inhibited area, and drive mode selection command means for outputting a command signal to said heat engine control means on the basis of results of a determination by said area determination means so that said power-non-generating drive mode is selected when said present position of said automobile is found to be within said pollution-inhibited area but said power-generating drive mode is selected when said present position of said automobile is found to be outside said pollution-inhibited area.

9. The navigation system according to claim 8, wherein said electric automobile further includes, as an additional drive mode, a forced power-generating mode in which said automobile is driven with said alternator always operated, said area determination means includes means for determining, based on information from said present position detection means and said pollution-inhibited area information storage means, whether said present position of said automobile is in a zone approaching said pollution-inhibited area and also whether said pollution-inhibited area still remains along a planned drive route from said present position of said automobile to said destination, and said drive mode selection command means includes means for outputting a command signal to select said forced power-generating mode until said battery is brought into a predetermined charged state when based on the results of said determination by said area determination means, said present position of said automobile is determined to be within said zone approaching said pollution-inhibited area and said pollution-inhibited area is determined to still remain along said planned drive route to said destination.

10. The navigation system according to claim 1, wherein a global positioning system is used as said present position detection means.

11. The navigation system of claim 1, further comprising:

urging means for urging a user to set another destination when said reachability determination means determines that said automobile cannot reach said destination, wherein said use-condition-limited reachability determination means limits the use of the electrical power when a predetermined period of time elapses after said urging means urges the user to set the another destination.

12. A navigation method for providing a guidance concerning travelling of an electric automobile having a battery, an electric drive motor for driving wheels by electric power from said battery, motor control means for controlling operation of said electric drive motor by adjusting electric power to be fed to said electric drive motor in accordance with an output demand operation, and remaining capacity detection means for detecting a remaining capacity of said battery, by using a navigation system, mounted on said electric automobile, providing with, road map information storage means for storing road map information, drive plan information input means for inputting operation with respect to information on a drive plan of an automobile, present position detecting means for detecting a present position of said automobile, and indication control means for controlling at least one of screen display information and audio indication information of map information and route information on the basis of pieces of information from said road map information storage means, said drive plan information input means and said present position detecting means, the method comprising:

inputting, as a first step, a destination of said automobile via said drive plan information input means, determining, as a second step, based on a distance planned to be driven by said automobile from the detected present position to said destination and said remaining capacity of said battery determined by said remaining capacity detection means, whether said automobile can reach said destination with said remaining capacity of said battery, indicating, as a third step, via said indication control means on the basis of results of a determination in said second step; and limiting use of electrical power to extend a driving range of said automobile.

13. The navigation method according to claim 12, wherein said first step includes inputting, as said drive plan information, a planned charging point at which charging of said battery is planned along a route to said destination, in addition to said destination, and said second step includes determining, based on a distance planned to be driven by said automobile from the detected present position to said planned charging point and said remaining capacity of said battery determined by said remaining capacity detection means, whether said automobile can reach said planned charging point with said remaining capacity of said battery.

14. The navigation method according to claim 12, wherein said limiting step sets, when said automobile is determined to be unable to reach said destination in said second step, a use condition for any one of said electric drive motor and an accessory so as to permit use of said battery while economizing on electric power and then determining whether said automobile can reach said destination under the so-set motor use condition.

15. The navigation method according to claim 12, wherein said third step includes indicating the need for a change in and reset for said drive plan information when said automobile is determined to be unable to reach said destination in said second step.

16. The navigation method according to claim 12, wherein said first step includes, inputting a plurality of charging points, which are available along said route to said destination, in addition to said destination, said second step further includes, determining with respect to each of said available charging points whether said automobile can reach said available charging points with said remaining capacity of said battery, when said automobile is determined to be unable to reach said destination in said second step, and said third step includes, displaying at least one of said available charging points to which said automobile is found to be reachable in said second step.

17. The navigation method according to claim 12, wherein said second step includes, performing a determination at the time of input of said drive plan information, and performing determinations in response to variations in the remaining capacity of said battery during travelling of said automobile.

18. The navigation method according to claim 12, wherein said electric automobile further includes, an alternator connected to said battery to permit charging of said battery, a dynamo heat engine for driving said alternator, and heat engine control means for controlling operation of said heat engine, whereby said automobile is constructed as a hybrid electric automobile having, as drive modes, a power-generating drive mode in which said automobile is driven while operating said alternator as needed and a power-non-generating drive mode in which said automobile is driven only by electric power charged in said battery, and said navigation system further includes, pollution-inhibited area storage means containing information on a pollution-inhibited area corresponding to said road map information, area determination means for determining, based on information from said present position detection means and said pollution-inhibited area storage means, whether said present position of said automobile is in said pollution-inhibited area, and drive mode selection command means for outputting a command signal to said heat engine control means on the basis of results of a determination by said area determination means so that said power-non-generating drive mode is selected when said present position of said automobile is found to be within said pollution-inhibited area but said power-generating drive mode is selected when said present position of said automobile is found to be outside said pollution-inhibited area.

19. The navigation method according to claim 18, wherein said electric automobile further includes, as an additional drive mode, a forced power-generating mode in which said automobile is driven with said alternator always operated, said area determination means includes means for determining, based on information from said present position detection means and said pollution-inhibited area information storage means, whether said present position of said automobile is in a pollution-inhibited-area approaching zone close to said pollution-inhibited area and also whether said pollution-inhibited area still remains along a planned drive route from said present position of said automobile to said destination, and said drive mode selection command means includes means for outputting a command signal to select said forced power-generating mode until said battery is brought into a predetermined charged state when based on the results of said determination by said area determination means, said present position of said automobile is determined to be within said zone approaching said pollution-inhibited area and said pollution-inhibited area is determined to still remain along said planned drive route to said destination.

20. The navigation system according to claim 12, wherein a global positioning system is used as said present position detection means.

21. The navigation method of claim 12, further comprising:

urging a user to set another destination when said second step determines that the automobile cannot reach said destination, wherein said limiting step limits the use of the electrical power when a predetermined period of time elapses after said urging step urges the user to set the another destination.

22. A navigation system for an electric automobile having a battery, an electric drive motor for driving wheels by electric power from said battery, motor control means for controlling operation of said electric drive motor by adjusting electric power fed to said electric drive motor in accordance with an output demand operation, and remaining capacity detection means for detecting a remaining capacity of said battery, the navigation system comprising:

an alternator connected to said battery to permit charging of said battery;

a dynamo head engine for driving said alternator;

heat engine control means for controlling operation of said heat engine, whereby said automobile being constructed as a hybrid electric automobile having, as drive modes, a power-generating drive mode in which said automobile is driven while operating said alternator as needed and a power-non-generating drive mode in which said automobile is driven only by electric power charged in said battery without operating said alternator;

road map information storage means for storing road map information;

drive plan information input means for inputting drive plan information including a destination of said automobile;

present position detecting means for detecting a present position of said automobile;

indication control means for controlling at least one of screen display information and audio indication information of map information and route information on the basis of information from said road map information storage means, said drive plan information input means, and said present position detecting means;

reachability determination means for determining, based on a distance planned to be driven by said automobile from the detected present position to said destination and said remaining capacity of said battery determined by said remaining capacity detection means, whether said automobile can reach said destination with said remaining capacity of said battery;

pollution-inhibited area storage means containing information on a pollution-inhibited area corresponding to said road map information;

area determination means for determining, based on information from said present position detection means and said pollution-inhibited area storage means, whether said present position of said automobile is in said pollution-inhibited area; and drive mode selection command means for outputting a command signal to said heat engine control means on the basis of results of a determination by said area determination means so that said power-non-generating drive mode is selected when said present position of said automobile is found to be within said pollution-inhibited area but said power-generating drive mode is selected when said present position of said automobile is found to be outside said pollution-inhibited area.

23. The navigation system according to claim 22, wherein said electric automobile further includes, as an additional drive mode, a forced power-generating mode in which said automobile is driven with said alternator always operated, said area determination means includes means for determining, based on information from said present position detection means and said pollution-inhibited area information storage means, whether said present position of said automobile is in a zone approaching said pollution-inhibited area and also whether said pollution-inhibited area still remains along a planned drive route from said present position of said automobile to said destination, and said drive mode selection command means includes means for outputting a command signal to select said forced power-generating mode until said battery is brought into a predetermined charged state when based on the results of said determination by said area determination means, said present position of said automobile is determined to be within said zone approaching said pollution-inhibited area and said pollution-inhibited area is determined to still remain along said planned drive route to said destination.

* * * * *